US011032820B1

(12) United States Patent
Kalavakuru et al.

(10) Patent No.: US 11,032,820 B1
(45) Date of Patent: Jun. 8, 2021

(54) RECEIVING WIRELESS LOCAL AREA NETWORK (WLAN) PACKETS FROM CO-LOCATED ACCESS POINT RADIOS AND CLIENT DEVICE RADIOS

(71) Applicant: Cisco Technology, Inc., San Jose, CA (US)

(72) Inventors: Sivadeep Reddy Kalavakuru, Akron, OH (US); Gerald B. Johnson, Hudson, OH (US); Michael Marlborough, Akron, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/185,899

(22) Filed: Nov. 9, 2018

(51) Int. Cl.
*H04L 12/50* (2006.01)
*H04W 72/04* (2009.01)
*H04W 88/08* (2009.01)
*H04W 84/12* (2009.01)

(52) U.S. Cl.
CPC ........ *H04W 72/0453* (2013.01); *H04W 84/12* (2013.01); *H04W 88/08* (2013.01)

(58) Field of Classification Search
CPC .. H04W 72/0453; H04W 84/12; H04W 88/08
USPC ........................................................ 370/329
See application file for complete search history.

(56) References Cited

U.S. PATENT DOCUMENTS

| | | | |
|---|---|---|---|
| 6,965,655 B1* | 11/2005 | Mostov | H03G 3/3068 375/345 |
| 9,813,930 B1* | 11/2017 | Ketonen | H04W 24/10 |
| 2013/0260798 A1* | 10/2013 | Moshfeghi | H04W 4/025 455/456.5 |
| 2014/0293869 A1* | 10/2014 | Jeffery | H04W 74/0808 370/328 |
| 2017/0063484 A1* | 3/2017 | Naghshvar | H04L 47/29 |
| 2018/0160334 A1* | 6/2018 | Deshpande | H04W 36/22 |
| 2019/0158975 A1* | 5/2019 | Petersen | H04L 69/18 |
| 2020/0280827 A1* | 9/2020 | Fechtel | H04W 4/80 |

\* cited by examiner

*Primary Examiner* — Kwang B Yao
*Assistant Examiner* — Xuan Lu
(74) *Attorney, Agent, or Firm* — Merchant & Gould P.C.

(57) ABSTRACT

Receiving Wireless Local Area Network (WLAN) packets from co-located access point radios and client device radios may be provided. First, a plurality of switchable gain devices corresponding to an auxiliary radio may be placed into a toggling state in response to the auxiliary radio being placed in a sniffer mode. Next, it may be determined that a primary radio is transmitting within a frequency range of a frequency band. Then, in response to determining that the primary radio is transmitting within the frequency range of the frequency band, a one of the plurality of switchable gain devices corresponding to the frequency band may be placed into a low gain state when the auxiliary radio is sniffing the frequency range of the frequency band.

19 Claims, 4 Drawing Sheets

RECEIVING WIRELESS LOCAL AREA NETWORK (WLAN) PACKETS FROM CO-LOCATED ACCESS POINT RADIOS AND CLIENT DEVICE RADIOS

TECHNICAL FIELD

The present disclosure relates generally to access points, in particular to co-located access point radios.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the WAP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
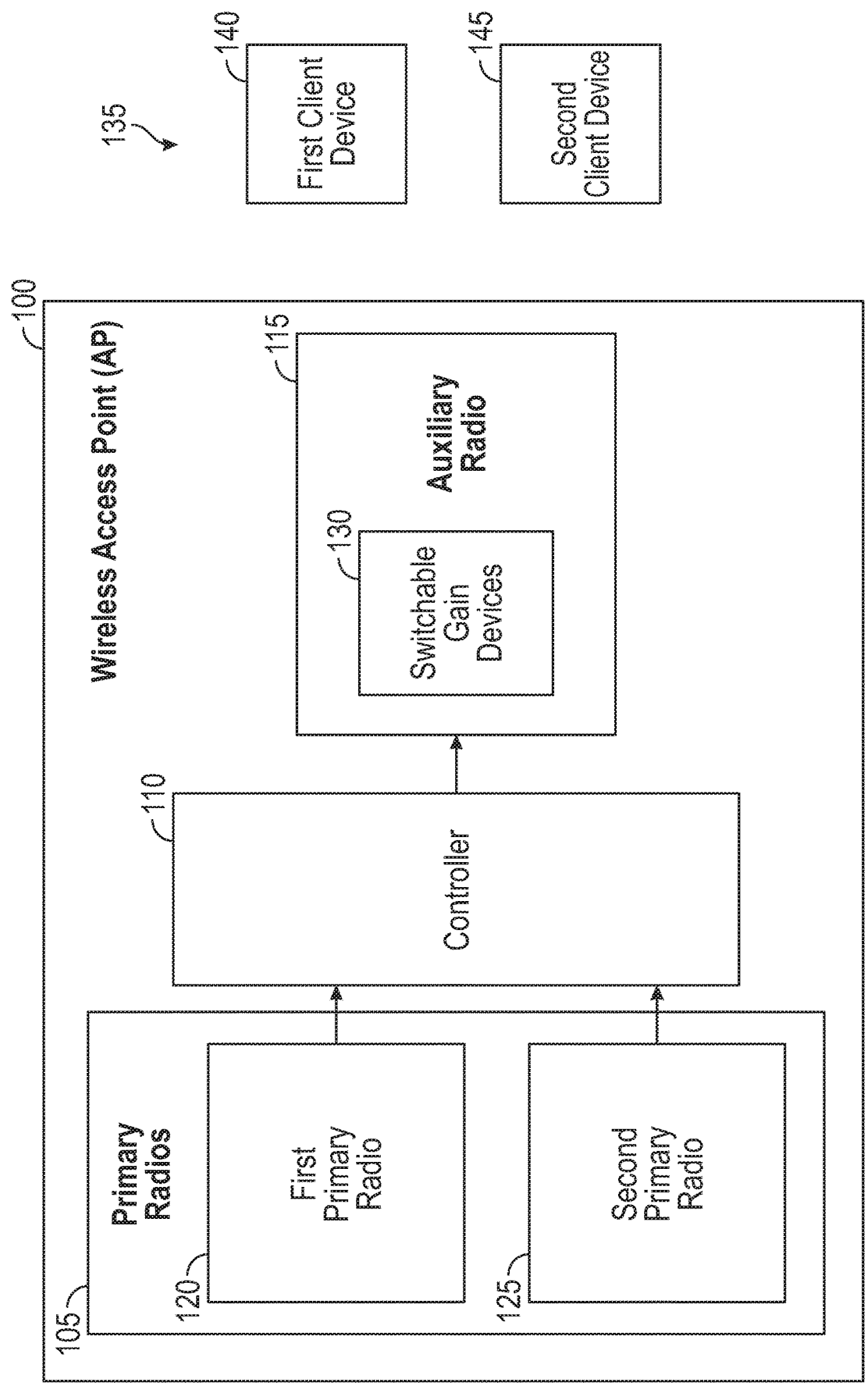
FIG. 1 shows an access point.

Receiving Wireless Local Area Network (WLAN) packets from co-located access point radios and client device radios may be provided. First, a plurality of switchable gain devices corresponding to an auxiliary radio may be placed into a toggling state in response to the auxiliary radio being placed in a sniffer mode. Next, it may be determined that a primary radio is transmitting within a frequency range of a frequency band. Then, in response to determining that the primary radio is transmitting within the frequency range of the frequency band, a one of the plurality of switchable gain devices corresponding to the frequency band may be placed into a low gain state when the auxiliary radio is sniffing the frequency range of the frequency band.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wireless Local Area Network (WLAN) Access Points (APs) may be designed with a multiple radio architecture in order to increase system throughput and provide a wireless environment monitoring capability. System throughput may be improved by using multiple AP primary serving radios that may communicate with client devices. Other features such as spectrum monitoring (e.g., a spectrum monitor mode), client location (e.g., an Angle-of-Approach (AoA) Capture mode or a client location mode), and WLAN sniffing (e.g., a sniffer mode) may be performed by an AP auxiliary radio in order to minimize the impact to the AP primary serving radios' throughput. The AP primary serving radios and the AP auxiliary radio may be co-located at the AP.

Monitor radios (e.g., the AP auxiliary radio) may use a Low Noise Amplifier (LNA) in each receiver path to improve receiver sensitivity. This may be beneficial for listening to the more distant client devices. The improved receiver sensitivity may be accompanied by a reduction in receiver maximum signal performance. As a result, receiver overload and consequent packet errors may occur while listening to the strong nearby co-located AP primary serving radio transmitters.

Consistent with embodiments of the disclosure, a WLAN AP auxiliary radio system may be provided that has good receiver sensitivity while monitoring the more distant client devices as well as strong signal handling to prevent receiver overload while listening to the high signal levels from the nearby co-located AP primary serving radio transmitters. Embodiments of the disclosure may comprise a WLAN AP auxiliary multi-band, multi-purpose radio system that may have receivers with switchable gain devices that may be configured to optimize the monitoring of packet transmissions from co-located AP primary multi-band serving radios and more distant client device radios.

An auxiliary radio spectrum monitor mode and a client location mode may configure the switchable gain devices for a high gain state to optimize receiver sensitivity. However, with a sniffer mode, the auxiliary radio may configure switchable gain devices for a switchable gain state controlled by the transmit state of the AP primary serving radio that may be monitored. Accordingly, the auxiliary radio may use a low gain state to prevent receiver overload while listening to the high signal levels from the nearby AP primary serving radio transmitters and using a high gain state to optimize receiver sensitivity during the client device radio transmissions.

FIG. 1 shows a wireless Access Point (AP) 100 consistent with embodiments of the disclosure for receiving wireless Local Area Network (WLAN) packets from co-located access point radios and client device radios. As shown in FIG. 1, wireless AP 100 may comprise primary radios 105, a controller 110, and auxiliary radio 115. Primary radios 105 may comprise first primary radio 120 and second primary radio 125. Auxiliary radio 115 may comprise switchable gain devices 130. One or both of first primary radio 120 and second primary radio 125 may comprise, for example, a radio that is switchable between a 2.4 GHz band and a 5 GHz band. Also, one or both of first primary radio 120 and second primary radio 125 may comprise, for example, a radio that uses a 5 GHz radio band.

Wireless AP 100 may comprise a networking hardware device that may allow a plurality of wireless client devices 135 (e.g., a first client device 140 and a second client device 145) to connect to a wired network. Any of plurality of wireless client devices 135 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device capable of accessing and using the network. While FIG. 1 shows plurality of wireless client devices 135 comprising two devices (i.e., first client device 140 and second client device 145), plurality of wireless client devices 135 may comprise any number of devices and is not limited to two devices.

Wireless AP 100 may comprise a multiple radio architecture in order to increase system throughput and provide wireless environment monitoring capability. Primary radios 105 may improve throughput by providing multiple AP primary serving radios that communicate with plurality of wireless client devices 135. Auxiliary radio 115 may perform other features such as spectrum monitoring, client device location, and WLAN sniffing. Because auxiliary radio 115 may perform these functions, primary radios 105 may not need to perform these function, which may give primary radios 105 more capacity to serve plurality of wireless client devices 135.

As stated above, auxiliary radio 115 may comprise switchable gain devices 130. Switchable gain devices 130 may comprise, but are not limited to, switchable gain Low Noise Amplifiers (LNAs). Switchable gain devices 130 may be switched from a high gain state to a toggling state. In the toggling state, switchable gain devices 130 may be switched between the high gain state and a low gain state.

Consistent with embodiments of the disclosure, the aforementioned switchable gain states may be controlled by controller 110 that may use the transmit states of primary radio 105 that are being monitored. A low gain state may be used to prevent receiver overload of auxiliary radio 115 while listening to the high signal levels from nearby primary radio 105 transmitters. A high gain state may be used to optimize receiver sensitivity during transmissions of plurality of wireless client devices 135.

Controller 110 may be practiced in hardware and/or in software (including firmware, resident software, microcode, etc.) or in any other circuits or systems. Controller 110 may be practiced in electrical circuits comprising discrete electronic elements, packaged or integrated electronic chips containing logic gates, a circuit utilizing a microprocessor, or on a single chip containing electronic elements or microprocessors. Furthermore, controller 110 may also be practiced using other technologies capable of performing logical operations such as, for example, AND, OR, and NOT, including but not limited to, mechanical, optical, fluidic, and quantum technologies. Furthermore, controller 110 may be practiced by a computing device 400 as described in greater detail below with respect to FIG. 4.

Figure 2:
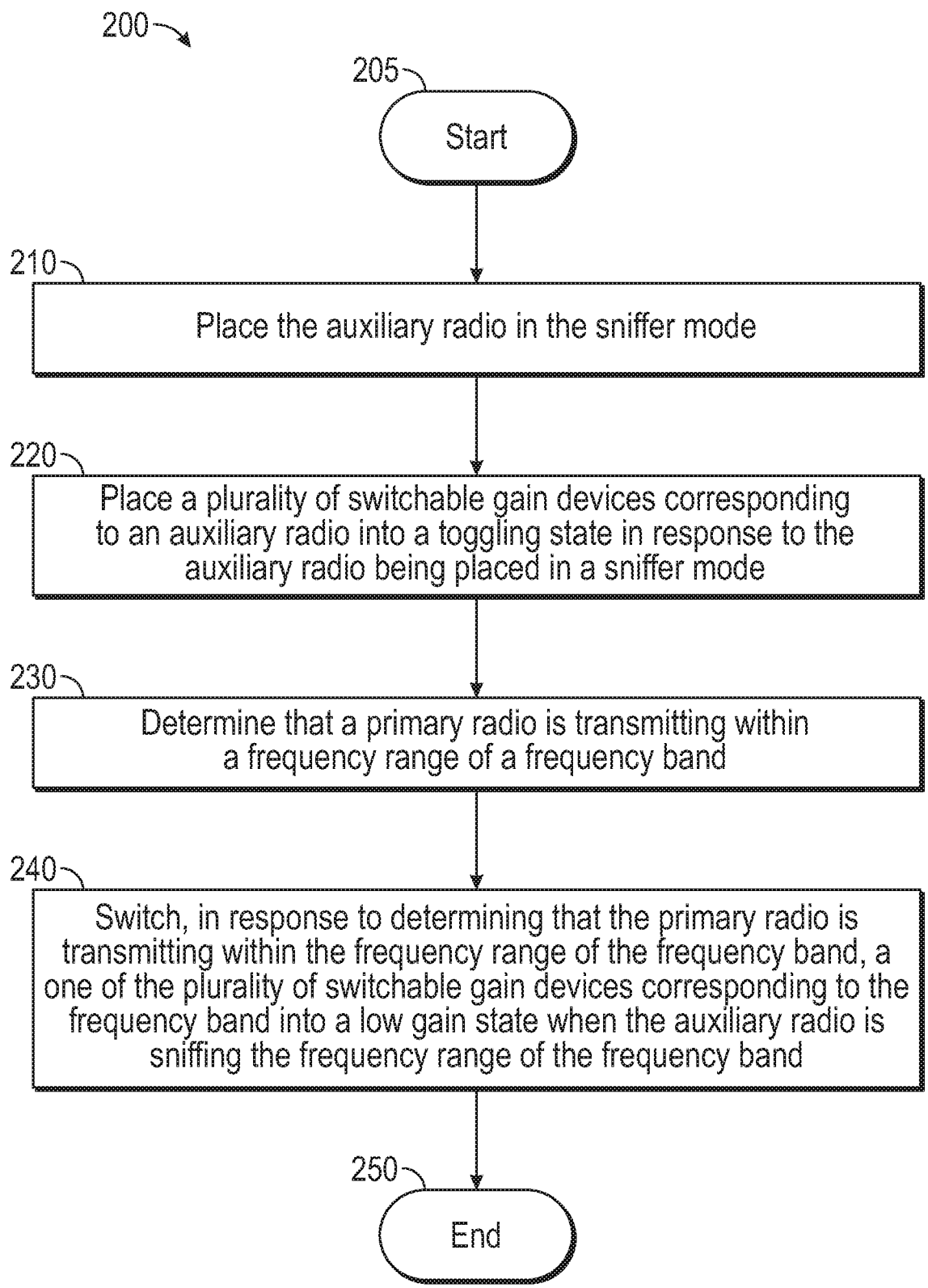
FIG. 2 is a flow chart of a method for receiving wireless local area network (WLAN) packets from co-located access point radios and client device radios.

FIG. 2 is a flow chart setting forth the general stages involved in a method 200 consistent with an embodiment of the disclosure for receiving WLAN packets from co-located access point radios and client device radios. Method 200 may be implemented using controller 110 as described in more detail above with respect to FIG. 1. Ways to implement the stages of method 200 will be described in greater detail below.

Method 200 may begin at starting block 205 and proceed to stage 210 where controller 110 may place auxiliary radio 115 in the sniffer mode. For example, auxiliary radio 115 may operate in a number of different modes. These modes may comprise, but are not limited to, spectrum monitoring (e.g., a spectrum monitor mode), client location (e.g., an Angle-of-Approach (AoA) Capture mode or a client location mode), and WLAN sniffing (e.g., a sniffer mode). The spectrum monitor mode may comprise a process to classify the radio environment around wireless AP 100. In this mode, signals may be classified as desired WLAN packets from client devices or undesired interference from items such as microwave ovens or cordless telephones. With the client location mode, received signals may be processed by AoA, for example, to determine the location of the client devices. With the sniffer mode, receiver signals may be processed to provide data analytics regarding the WLAN transmit signals from wireless AP 100 primary radios 105 and plurality of wireless client devices 135.

From stage 210, where controller 110 placed auxiliary radio 115 in the sniffer mode, method 200 may advance to stage 220 where controller 110 may place switchable gain devices 130 corresponding to auxiliary radio 115 into a toggling state in response to auxiliary radio 115 being placed in a sniffer mode. For example, with the spectrum monitor mode and the client location mode, switchable gain devices 130 may be configured for a high gain state to optimize receiver sensitivity of auxiliary radio 115. However, in the sniffer mode, switchable gain devices 130 may be placed in a toggling state that may be controlled by a transmit state of a one of primary radios 105 that is being monitored. The low gain state may prevent receiver overload while listening to high signal levels from nearby primary radio 105 transmitters and using the high gain state to optimize receiver sensitivity during radio transmissions of plurality of wireless client devices 135.

Once controller 110 places switchable gain devices 130 corresponding to auxiliary radio 115 into the toggling state in response to auxiliary radio 115 being placed in the sniffer mode in stage 220, method 200 may continue to stage 230 where controller 110 may determine that a primary radio (e.g., first primary radio 120 or second primary radio 125) is transmitting within a frequency range of a frequency band. For example, it may be determined that first primary radio 120 is in the 5 GHz band and tuned to the 5500 MHz frequency range in the 5 GHz band.

After controller 110 determines that the primary radio (e.g., first primary radio 120 or second primary radio 125) is transmitting within the frequency range of the frequency band in stage 230, method 200 may proceed to stage 240 where controller 110 may switch, in response to determining that the primary radio (e.g., first primary radio 120 or second primary radio 125) is transmitting within the frequency range of the frequency band, a one of the plurality of switchable gain devices corresponding to the frequency band into a low gain state when auxiliary radio 115 is sniffing the frequency range of the frequency band. For example, auxiliary radio 115 may be sniffing the 5500 MHz frequency range in the 5 GHz band. If so, the one of the plurality of switchable gain devices used to receive this signal may be switched to the low gain state. If, for example, auxiliary radio 115 had been sniffing the 5180 MHz frequency range in the 5 GHz band, the switch to the low gain state may not be made.

Once controller 110 switches the one of the plurality of switchable gain devices corresponding to the frequency band into the low gain state when auxiliary radio 115 is sniffing the frequency range of the frequency band in stage 240, method 200 may then end at stage 250.

Figure 3:
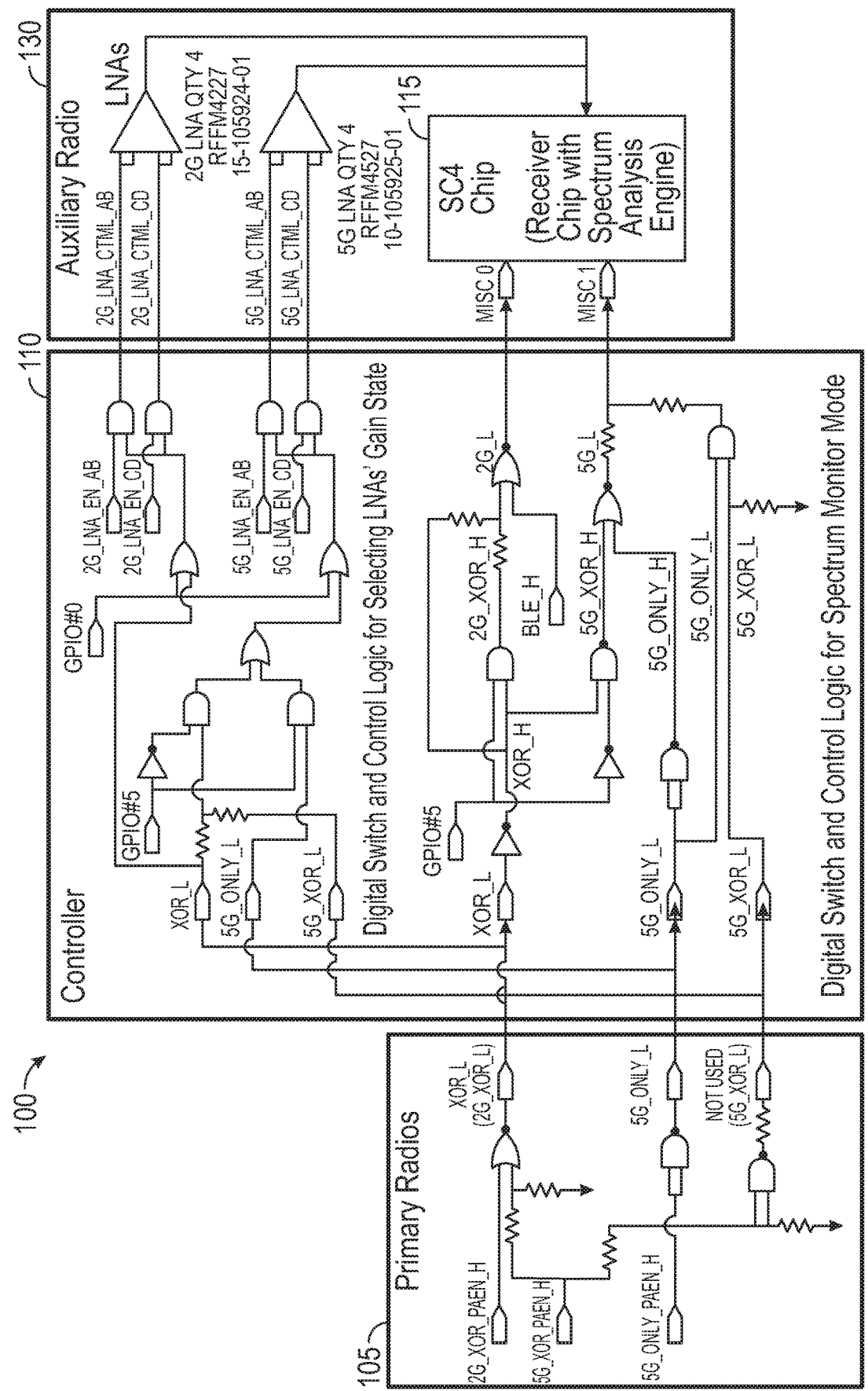
FIG. 3 shows an access point.

FIG. 3 shows an embodiment of wireless AP 100 where controller 110 may comprise logic circuitry. As shown in FIG. 3, embodiments of the disclosure may include a receiver subsystem for each monitored frequency band. Each receiver subsystem may have multiple receiver paths. Each receiver path may incorporate a switchable gain Low Noise Amplifier (LNA) device with a gain control pin that may select either a high or low gain state.

The transmit enable logic signal from each co-located AP serving radio transmitter may comprise an input to a digital switch and control logic circuit on the controller. Output logic signals from the digital switch and control logic circuit may be routed to the gain control pin on each switchable gain LNA in the receiver paths of the auxiliary radio.

The auxiliary radio spectrum monitor mode and client location mode may set the control logic to configure the LNA devices for a high gain state to optimize receiver sensitivity. This configuration may decrease each receiver path's noise figure to improve receiver sensitivity, which may be beneficial for receiving the weaker signals from more distant client devices.

The sniffer mode may set the control logic to configure the LNA devices for a switchable gain state. In this case, digital switches may be configured to route the transmit enable logic signal from the monitored AP serving radio transmitter to the gain control pin of the LNAs in the appropriate frequency band receiver paths on the auxiliary radio. When the monitored primary radio 105 is not transmitting, the LNAs may be set to a high gain state to increase receiver sensitivity while receiving the weaker signal levels from the more distant client devices. When the monitored primary radio 105 is transmitting, the LNAs may be set to a low gain state to increase each auxiliary radio receiver path's maximum signal performance. This may prevent receiver overload while listening to the strong signal levels from the nearby co-located primary radio 105 transmitters.

Figure 4:
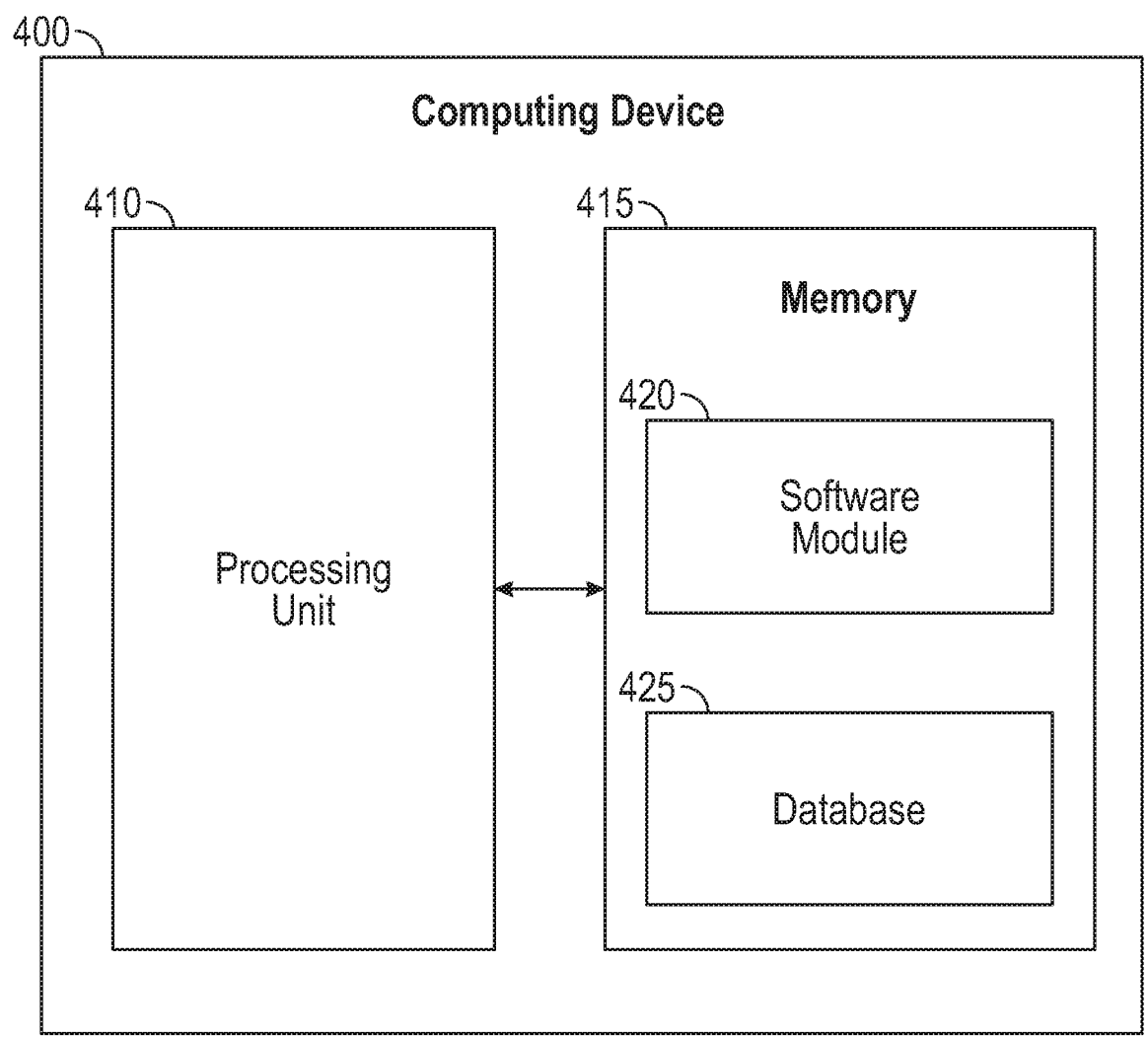
FIG. 4 shows a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform processes for receiving WLAN packets from co-located access point radios and client device radios, including for example, any one or more of the stages from method 200 described above with respect to FIG. 2. Computing device 400, for example, may provide an operating environment for controller 110. Controller 110 may operate in other environments and is not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. Furthermore, computing device 400 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    placing a plurality of switchable gain devices of an auxiliary radio into a toggling state in response to the auxiliary radio being placed in a sniffer mode, wherein the toggling state comprises a low gain state and a high gain state, wherein the auxiliary radio is co-located with a primary radio at an access point, and wherein the plurality of switchable gain devices are located on a plurality of receiver paths in the auxiliary radio;
    determining that the primary radio is transmitting within a frequency range of a frequency band; and
    switching, in response to determining that the primary radio is transmitting within the frequency range of the frequency band, a one of the plurality of switchable gain devices of the auxiliary radio corresponding to the frequency band into the low gain state from the high gain state when the auxiliary radio is sniffing the frequency range of the frequency band.

2. The method of claim 1, further comprising placing the auxiliary radio in the sniffer mode.

3. The method of claim 1, further comprising placing the auxiliary radio in the sniffer mode wherein the sniffer mode comprises a mode in which the auxiliary radio receives signals that are processed to provide data analytics regarding Wireless Local Area Network (WLAN) transmit signals from the primary radio and client radios.

4. The method of claim 1, wherein placing the plurality of switchable gain devices corresponding to the auxiliary radio into the toggling state comprises placing the plurality of switchable gain devices corresponding to the auxiliary radio into the toggling state wherein the plurality of switchable gain devices comprise switchable gain Low Noise Amplifier (LNA) devices.

5. The method of claim 1, wherein determining that the primary radio is transmitting within the frequency range of the frequency band comprises determining that the primary radio is transmitting within the frequency range of the frequency band in response to receiving a signal from the primary radio indicating that the primary radio is transmitting within the frequency range of the frequency band.

6. The method of claim 1, further comprising switching the one of the plurality of switchable gain devices corresponding to the frequency band into the high gain state when the primary radio is no longer transmitting within the frequency range of the frequency band.

7. The method of claim 1, further comprising placing the plurality of switchable gain devices correspond to the auxiliary radio into the high gain state in response to the auxiliary radio being placed in an Angle-of-Approach (AoA) Capture mode.

8. The method of claim 1, further comprising placing the plurality of switchable gain devices correspond to the auxiliary radio into the high gain state in response to the auxiliary radio being placed in a Spectrum Analysis mode.

9. An apparatus comprising:
    a first primary radio;
    a second primary radio;
    an auxiliary radio, wherein the auxiliary radio is co-located with the first primary radio and the second primary radio on an access point; and
    a controller configured to;
        receive a signal indicating that a one of the first primary radio and the second primary radio is transmitting within a frequency range of a frequency band, and
        switch, in response to receiving the signal indicating that the one of the first primary radio and the second primary radio is transmitting within the frequency range of the frequency band, a switchable gain device of the auxiliary radio corresponding to the frequency band into a low gain state from a high gain state when the auxiliary radio is sniffing the frequency range of the frequency band, wherein the switchable gain device of the auxiliary radio is operative to be placed into a toggling state, and wherein the toggling state comprises the low gain state and the high gain state, and wherein the plurality of switchable gain devices are located on a plurality of receiver paths in the auxiliary radio.

10. The apparatus of claim 9, wherein the first primary radio comprises a radio that is switchable between a 2.4 GHz band and a 5 GHz band.

11. The apparatus of claim 9, wherein the second primary radio is a 5 GHz band radio.

12. The apparatus of claim 9, wherein the apparatus comprises the wireless access point (AP).

13. The apparatus of claim 9, wherein the controller is further configured to switch the switchable gain device corresponding to the frequency band into the high gain state when the primary radio is no longer transmitting within the frequency range of the frequency band.

14. An apparatus comprising:
a memory storage; and
a processing unit coupled to the memory storage, wherein the processing unit is operative to:
place a plurality of switchable gain devices corresponding to an auxiliary radio into a toggling state in response to the auxiliary radio being placed in a sniffer mode, wherein the toggling state comprises a low gain state and a high gain state, wherein the auxiliary radio is co-located with a primary radio in an access point, and wherein the plurality of switchable gain devices are located on a plurality of receiver paths in the auxiliary radio;
determine that the primary radio is transmitting within a frequency range of a frequency band; and
switch, in response to determining that the primary radio is transmitting within the frequency range of the frequency band, a one of the plurality of switchable gain devices of the auxiliary radio corresponding to the frequency band into the low gain state from the high gain state when the auxiliary radio is sniffing the frequency range of the frequency band.

15. The apparatus of claim 14, wherein the processing unit is further operative to place the auxiliary radio in the sniffer mode wherein the sniffer mode comprises a mode in which the auxiliary radio receives signals that are processed to provide data analytics regarding Wireless Local Area Network (WLAN) transmit signals from the primary radio and client radios.

16. The apparatus of claim 14, wherein the processing unit being operative to determine that the primary radio is transmitting within the frequency range of the frequency band comprises the processing unit being operative to receive a signal from the primary radio indicating that the primary radio is transmitting within the frequency range of the frequency band.

17. The apparatus of claim 14, wherein the processing unit is further operative to switch the one of the plurality of switchable gain devices corresponding to the frequency band into the high gain state when the primary radio is no longer transmitting within the frequency range of the frequency band.

18. The apparatus of claim 14, wherein the processing unit is further operative to place the one of the plurality of switchable gain devices correspond to the auxiliary radio into the high gain state in response to the auxiliary radio being placed in an Angle-of-Approach (AoA) Capture mode.

19. The apparatus of claim 14, wherein the processing unit is further operative to place the one of the plurality of switchable gain devices correspond to the auxiliary radio into the high gain state in response to the auxiliary radio being placed in a Spectrum Analysis mode.

* * * * *